US012668697B2

(12) United States Patent
Liu et al.

(10) Patent No.: US 12,668,697 B2
(45) Date of Patent: Jun. 30, 2026

(54) COMPOSITIONS AND METHODS USEFUL FOR FORMING SINTERED ARTICLES

(71) Applicant: Arkema France, Colombes (FR)

(72) Inventors: David Liu, Bala Cynwyd, PA (US); William Wolf, Philadelphia, PA (US); Brendan Mcgrail, Phoenixville, PA (US)

(73) Assignee: Arkema France, Puteaux (FR)

( * ) Notice: Subject to any disclaimer, the term of this patent is extended or adjusted under 35 U.S.C. 154(b) by 858 days.

(21) Appl. No.: 17/260,036

(22) PCT Filed: May 29, 2019

(86) PCT No.: PCT/EP2019/063926
§ 371 (c)(1),
(2) Date: Jan. 14, 2021

(87) PCT Pub. No.: WO2020/015906
PCT Pub. Date: Jan. 23, 2020

(65) Prior Publication Data

US 2021/0309850 A1 Oct. 7, 2021

Related U.S. Application Data

(60) Provisional application No. 62/699,976, filed on Jul. 18, 2018.

(51) Int. Cl.

| | |
|---|---|
| ***C08L 71/00*** | (2006.01) |
| ***B29C 64/165*** | (2017.01) |
| ***B33Y 10/00*** | (2015.01) |
| ***B33Y 70/00*** | (2020.01) |
| ***C09D 11/101*** | (2014.01) |
| ***C09D 11/102*** | (2014.01) |
| ***C09D 11/30*** | (2014.01) |
| *B29K 33/00* | (2006.01) |
| *B29K 101/12* | (2006.01) |

(52) U.S. Cl.
CPC ............ *C08L 71/00* (2013.01); *B29C 64/165* (2017.08); *B33Y 10/00* (2014.12); *B33Y 70/00* (2014.12); *C09D 11/101* (2013.01); *C09D 11/102* (2013.01); *C09D 11/30* (2013.01); *B29K 2033/12* (2013.01); *B29K 2101/12* (2013.01); *C08L 2203/30* (2013.01)

(58) Field of Classification Search
None
See application file for complete search history.

(56) References Cited

U.S. PATENT DOCUMENTS

| | | | | |
|---|---|---|---|---|
| 10,280,299 | B2 * | 5/2019 | Ganapathiappan | B33Y 70/00 |
| 11,148,361 | B2 * | 10/2021 | Jiang | B33Y 80/00 |
| 11,179,886 | B2 * | 11/2021 | Jiang | C09D 11/101 |
| 2007/0241482 | A1 | 10/2007 | Giller et al. | |
| 2008/0138515 | A1 | 6/2008 | Williams | |
| 2009/0102101 | A1 | 4/2009 | Guilfoyle et al. | |
| 2015/0224575 | A1 | 8/2015 | Hirata | |
| 2015/0344682 | A1 * | 12/2015 | Ganapathiappan | B29C 64/124 522/182 |
| 2018/0110593 | A1 | 4/2018 | Khalil | |
| 2020/0071443 | A1 | 3/2020 | Mori et al. | |

FOREIGN PATENT DOCUMENTS

| | | | | |
|---|---|---|---|---|
| CN | 101245179 | A | 8/2008 | |
| TW | 202004341 | A | 1/2020 | |
| WO | WO2017127561 | A1 | 7/2017 | |
| WO | WO-2017127569 | A1 * | 7/2017 | B29C 64/106 |
| WO | 2019016738 | A1 | 1/2019 | |
| WO | WO2019018787 | A1 | 1/2019 | |

* cited by examiner

*Primary Examiner* — Sanza L. McClendon
(74) *Attorney, Agent, or Firm* — Christopher R. Lewis

(57) ABSTRACT

A sintered article may be formed from a composition containing at least sinterable thermoplastic particles and a curable (meth)acrylate resin component, wherein the sinterable thermoplastic particles are insoluble in the curable (meth)acrylate resin component at 25° C. The curable (meth) acrylate resin component may be cured, thereby forming an intermediate article which may be converted into a sintered article using conditions effective to remove at least a portion of the matrix formed by the cured curable (meth)acrylate resin component and to sinter the thermoplastic particles.

34 Claims, No Drawings

COMPOSITIONS AND METHODS USEFUL FOR FORMING SINTERED ARTICLES

CROSS-REFERENCE TO RELATED APPLICATIONS

This application is a U.S. national stage application under 35 U.S.C. § 371 of international application number PCT/EP2019/063926, filed May 29, 2019, which claims priority to U.S. patent application No. 62/699,976, filed Jul. 18, 2018.

FIELD OF THE INVENTION

The present invention relates to sintered articles comprised of fused thermoplastic particles, compositions useful for preparing such sintered articles, as well as methods for obtaining the sintered articles using the compositions. In particular, the invention pertains to compositions comprising sinterable thermoplastic particles and a curable (meth)acrylate resin component, wherein the curable (meth)acrylate resin component may be cured (by UV, for example) to form a sacrificial matrix within which the sinterable thermoplastic particles are bound. The cured matrix may then be at least partially removed (for example, by thermal and/or oxidative decomposition) and the sinterable thermoplastic particles fused together, thereby forming a sintered article.

BACKGROUND OF THE RELATED ART

The production of three dimensional polymeric articles using various printing technologies is of great interest currently, as 3D printing has certain processing advantages over traditional methods of forming articles from polymeric materials. Of the three main 3D printing technologies available at present, ultraviolet (UV) curing offers the highest resolution and, potentially, the fastest production speed as well. However, the major issue with the use of UV curing techniques in 3D printing is that the materials used are radiation-curable acrylates, which once cured provide thermoset acrylics. While the radiation-curable acrylates have fast cure rates, the products obtained therefrom are generally quite brittle and lack the toughness and yield properties of thermoplastics, as well as the range of properties offered by thermoplastics (such as high use temperatures, high chemical resistance and so forth). Much effort has been devoted to trying to improve the toughness, high temperature stability, and strength of such UV-curable systems, but generally speaking as long as the articles obtained are thermoset in character there will be constraints on the properties that can be achieved.

Accordingly, it would be desirable to develop technologies which permit the production of 3D printed articles which are at least substantially thermoplastic in nature.

SUMMARY OF THE INVENTION

According to one aspect of the invention, a composition is provided which is comprised of sinterable thermoplastic particles and a curable (meth)acrylate resin component, wherein the sinterable thermoplastic particles are insoluble in the curable (meth)acrylate resin component at 25° C.

According to a further aspect, the invention also provides a method of forming a sintered article, comprising:

a) curing a composition comprised of sinterable thermoplastic particles and a curable (meth)acrylate resin component, wherein the sinterable thermoplastic particles are insoluble in the curable (meth)acrylate resin component at 25° C., to form an intermediate article comprised of the sinterable thermoplastic particles bound by a matrix of the curable (meth)acrylate resin component in cured form; and
b) subjecting the intermediate article to conditions effective to remove at least a portion of the matrix and to sinter the sinterable thermoplastic particles, whereby the sinterable thermoplastic particles are fused together to form a sintered article.

A further aspect of the invention provides a method of making a sintered article, comprising:

a) applying a first layer of a composition comprised of sinterable thermoplastic particles and a curable (meth)acrylate resin component, wherein the sinterable thermoplastic particles are insoluble in the curable (meth)acrylate resin component at 25° C., onto a surface;
b) curing the first layer to provide a cured first layer;
c) applying a second layer of the composition onto the cured first layer;
d) curing the second layer to provide a cured second layer adhered to the cured first layer;
e) repeating steps c) and d) a desired number of times to build up a three-dimensional article comprised of the sinterable thermoplastic particles bound by a matrix of the curable (meth)acrylate resin component in cured form; and
f) subjecting the three-dimensional article to conditions effective to remove at least a portion of the matrix and to sinter the sinterable thermoplastic particles, whereby the sinterable thermoplastic particles are fused together to form a sintered article.

A method of making a three dimensionally printed article using a three dimensional printing method such as digital light projection, stereolithography or multi jet printing is provided in an additional aspect of the invention, wherein the method comprises irradiating a composition comprised of sinterable thermoplastic particles and a curable (meth)acrylate resin component, wherein the sinterable thermoplastic particles are insoluble in the curable (meth)acrylate resin component at 25° C., in a layer by layer manner to form the three dimensionally printed article.

DETAILED DESCRIPTION OF CERTAIN EMBODIMENTS OF THE INVENTION

The compositions of the present invention are comprised of sinterable thermoplastic particles and a curable (meth)acrylate resin component, wherein the sinterable thermoplastic particles are insoluble in the curable (meth)acrylate resin component at 25° C. As used herein, the term "insoluble" means that less than 10% of the thermoplastic present in the sinterable thermoplastic particles dissolves in the curable (meth)acrylate resin component after mixing 5 parts by weight of the sinterable thermoplastic particles and 95 parts by weight of the curable (meth)acrylate resin component and allowing the resulting mixture to stand undisturbed at 25° C. for 24 hours.

In certain embodiments of the invention, the composition at room temperature (25° C.) is in the form of a dispersion of sinterable thermoplastic particles (in solid particulate form) in a liquid matrix of the curable (meth)acrylate resin component. In one embodiment, the sinterable thermoplastic particles are homogeneously dispersed in a liquid matrix of the curable (meth)acrylate resin component. According to another embodiment, the sinterable thermoplastic particles are in the form of a stable, homogeneous dispersion in the liquid matrix of the curable (meth)acrylate resin component. In this context, "homogeneous" means that that the sinterable thermoplastic particles are evenly and uniformly distributed through a volume of the composition, as observed by the unaided human eye and "stable" means that the dispersion remains homogeneous for a period of at least 24 hours after the composition has been agitated to attain a homogeneous state and then left undisturbed at 25° C. One or more dispersing agents (such as a surfactant) may be included in the composition to assist in improving the homogeneity and stability of the dispersion.

Sinterable Thermoplastic Particles

The sinterable thermoplastic particles useful in the present invention are comprised of at least one thermoplastic, i.e., a polymer capable of melting when heated. The thermoplastic particles are capable of being sintered, which in the context of the present invention means that the thermoplastic particles may be formed into a coherent bonded mass by heating and/or compaction without melting the thermoplastic particles to the point of complete liquefaction. Typically, the sinterable thermoplastic particles are in the form of a fine powder. For example, the sinterable thermoplastic particles may have a volume median diameter (Dv50) of preferably from 5 microns to 3 mm, more preferably from 10 to 300 microns or most preferably from 15 to 100 microns as measured by a scanning electron microscope when dry. The bulk density of the sinterable thermoplastic particles may preferably be greater than 0.1 g/cm$^3$, more preferably greater than 0.3 g/cm$^3$ or most preferably greater than 0.4 g/cm$^3$.

The sinterable thermoplastic particles according to one aspect of the invention may be comprised primarily of substantially spherical particles, but other shapes (including irregular shapes) may also be employed. The sinterable thermoplastic particles may be subject to grinding, surface modification or other processing to modify a flow property or other characteristics of the sinterable thermoplastic particles. The sinterable thermoplastic particles may also comprise, in addition to thermoplastic, one or more additives such as fillers, flow agents, crystallization promoters or inhibitors, and the like. The sinterable thermoplastic particles may also comprise of blends of one or more suitable thermoplastics with other thermoplastics or additives.

Suitable thermoplastics includes polymers that will perform suitably in the compositions described herein, when subjected to the conditions of manufacturing a three-dimensional object in a three dimensional printer. The thermoplastic may be one of the so-called engineering thermoplastics known in the art. However, other types of thermoplastics potentially may also be used. For example, the thermoplastic present in the sinterable thermoplastic particles may have a melting point of 150° C. or more and/or a Tg of 100° C. or more. In other embodiments, the thermoplastic may have a melting point of 250° C. and/or a Tg of 200° C. or more. The melting point of the thermoplastic is measured by differential scanning calorimetry (DSC) during the second heat, using the following temperature cycle:

heat from 20° C. to 400° C. at 10° C./min;
cool from 400° C. to 20° C. at 1° C./min;
heat from 20° C. to 400° C. at 10° C./min.

The glass transition temperature of the thermoplastic is measured by differential scanning calorimetry (DSC), in particular during the second heating at 20° C./min according to ISO11357.

The thermoplastic may be amorphous, crystalline or semicrystalline.

Examples of suitable thermoplastics include polyaryletherketones (PAEKs), polyamides, polyimides and fluoropolymers. The term polyaryletherketones refers to polymers whose molecular backbone contains both ketone (R—CO—R) and ether groups (R—O—R), with the linking group R between the functional groups consisting of a disubstituted aryl group and is intended to encompass all homopolymers and copolymers (including e.g., terpolymers) and the like. In one embodiment, the polyaryletherketone is selected from the group consisting of polyetherketoneketone (PEKK), polyetheretherketone (PEEK), polyetherketone (PEK), polyetherketoneetherketoneketone (PEKEKK), and mixtures thereof.

In one embodiment, the polyaryletherketone comprises polyetherketoneketone (PEKK). Polyetherketoneketones suitable for use in embodiments of the present invention may comprise, consist essentially of or consist of repeating units represented by the following formulas I and II:

-A-C(=O)—B—C(=O)— I

-A-C(=O)-D-C(=O)— II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio may be easily varied as may be desired to achieve a certain set of properties, e.g., by varying the relative amounts of the different monomers used to prepare the polyetherketoneketone. Generally, a polyetherketoneketone having a relatively high Formula I:Formula II ratio will be more crystalline than a polyetherketoneketone having a lower Formula I:Formula II ratio. Thus, the T:I ratio may be adjusted so as to provide an amorphous (non-crystalline) polyetherketoneketone or a more crystalline polyetherketoneketone, as desired. In one embodiment, a polyetherketoneketone having a T:I isomer ratio of from about 50:50 to about 90:10 may be employed.

For example, the chemical structure for a polyetherketoneketone with all para-phenylene linkages [PEKK (T)] may be represented by formula III:

III

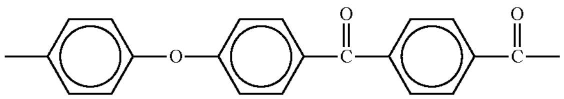

The chemical structure for a polyetherketoneketone with one meta-phenylene linkage in the backbone [PEKK (I)] may be represented by formula IV:

IV

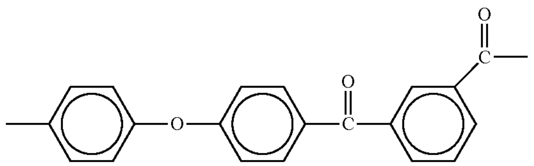

The chemical structure for a polyetherketoneketone with alternating T and I isomers, e.g., a homopolymer having 50% chemical compositions of both T and I [PEKK (T/I)] may be represented by formula V:

V

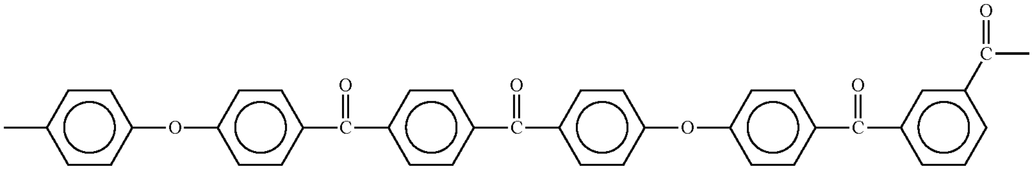

In another embodiment, the polyaryletherketone comprises polyetheretherketone (PEEK). Polyetheretherketones suitable for use in the present invention may comprise, consist essentially of or consist of repeating units (n≥1) represented by formula VI:

VI

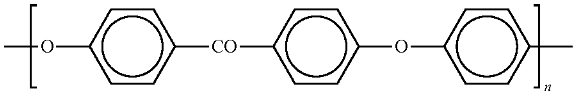

In another embodiment, the polyaryletherketone comprises polyetherketone (PEK). Polyetherketones suitable for use in the present invention may comprise, consist essentially of or consist of repeating units (n≥1) represented by formula VII:

VII

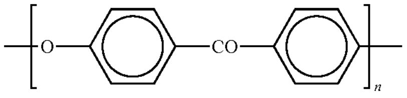

The polyaryletherketones may be prepared by any suitable method, such methods being well known in the art. For example, a polyaryletherketone may be formed by heating a substantially equimolar mixture of at least one bisphenol and at least one dihalobenzoid compound or at least one halophenol compound. The polymer may be amorphous or crystallized, which can be controlled through synthesis of the polymer. Thus, the polymer(s) may run the spectrum from non-crystalline to highly crystalline, depending on the intended use and industrial application for the coated wire. Additionally, the polymer(s) may also be of any suitable molecular weight and may be functionalized or sulfonated, if desired. In one embodiment, the polymer(s) undergo sulfonation or any example of surface modification known to one skilled in the art.

Suitable polyetherketoneketones are available from several commercial sources under various brand names. For example, polyetherketoneketone polymers are manufactured and supplied by Arkema under the trademark Kepstan®.

Illustrative polyamides (nylons) include in particular aliphatic polyamides, aromatic polyamides and aliphatic-aromatic polyamides such as amorphous and semi-crystalline polyamide (PA) 6, PA 11, PA 12 as well as copolyamide 6.6, 6.12, 6.10, 10.10, and 10.12. Illustrative polyimides include aliphatic, semi-aromatic and particularly aromatic polyimides, such as polyimides which are obtained by reacting tetracarboxylic acid dianhydrides (e.g., pyromellitic anhydride) with diprimary diamines (e.g., 4,4'-oxydianiline) to obtain intermediate polyamide-acids which may be converted by any one of several suitable methods, such as chemical or heat treatment, to the corresponding polyimide. Typically, suitable polyimides will contain phthalimide structures in the backbone of the polyimide. Illustrative fluoropolymers include in particular polyvinylidene fluorides (including homopolymers of vinylidene fluoride as well as copolymers of vinylidene fluoride with one or more other monomers, such as hexafluoropropylene, chlorotrifluoroethylene and/or tetrafluoroethylene). PVDF resins suitable for use in the present invention include the PVDF resins sold under the brand name Kynar® by Arkema. Examples of other suitable fluoropolymers include PTFE, FEP, PCTFE, ETFE, MFA, EFEP, THV and HTE. Suitable polycarbonates include, for example, polycarbonates prepared from dialcohols (especially aromatic dialcohols, such as bisphenol A and other bisphenols) with phosgene or an equivalent thereof such as a carbonate ester.

In certain embodiments of the invention, the sinterable thermoplastic particles may be present in the composition in an amount effective to constitute from 20 to 80%, preferably 25 to 60%, and most preferably 35 to 50% of the total weight of sinterable thermoplastic particles and curable (meth) acrylate resin component. Mixtures of different sinterable thermoplastic particles may be utilized.

Curable (Meth)acrylate Resin Component

In various embodiments of the invention, the curable (meth)acrylate resin component may be present in the composition in an amount effective to constitute 20 to 80%, preferably 40 to 75%, and most preferably 50 to 65% of the total weight of sinterable thermoplastic particles and curable (meth)acrylate resin component.

The curable (meth)acrylate resin component utilized in the compositions of the present invention is characterized by comprising, consisting essentially of or consisting of at least one (meth)acrylate-functionalized compound. In certain embodiments, the curable (meth)acrylate resin component is comprised of two, three, four or more different (meth) acrylate-functionalized compounds. A (meth)acrylate-functionalized compound may be described as an organic compound bearing one or more (meth)acrylate functional groups per molecule. As used herein, the term "(meth)acrylate" refers to both acrylate and methacrylate functional groups. (Meth)acrylate-functionalized compounds suitable for use in the present invention may be generally described as ethylenically unsaturated compounds containing at least one carbon-carbon double bond alpha to an ester group (a compound containing at least one α,β-unsaturated ester moiety), in particular a carbon-carbon double bond capable of participating in a free radical reaction or anionic reaction, in particular a reaction initiated by ultraviolet radiation or electron beam radiation. Such reactions may result in a polymerization or curing whereby the (meth)acrylate-functionalized compound becomes part of a polymerized matrix or polymeric chain. In various embodiments of the invention, the (meth)acrylate-functionalized compound may contain one, two, three, four, five or more (meth)acrylate functional groups per molecule. Combinations of multiple (meth)acrylate-functionalized compounds containing different numbers of (meth)acrylate groups may be utilized in the curable (meth)acrylate resin component employed in the present invention.

The curable (meth)acrylate resin component utilized in the present invention thus may contain one or more (meth) acrylate functional compounds capable of undergoing free radical and/or anionic polymerization (curing) initiated by exposure to ultraviolet or electron beam radiation. As used herein, the term "(meth)acrylate" refers to methacrylate ($—O—C(=O)—C(CH_3)=CH_2$) as well as acrylate ($—O—C(=O)—CH=CH_2$) functional groups. The (meth)acrylate-functionalized compounds may be oligomers or monomers or a combination of oligomer(s) and monomer(s).

The (meth)acrylate-functionalized compound(s) for use in the curable (meth)acrylate resin component may be selected so as to provide, once cured, a polymeric matrix that has the desired or necessary characteristics with respect to transforming the intermediate article obtained upon curing of the curable (meth)acrylate resin component into a sintered article. For example, the (meth)acrylate-functionalized compound(s) may contain one or more moieties that are particularly susceptible to thermal and/or oxidative degradation, whereby the matrix of the curable (meth)acrylate resin component in cured form which is present in the intermediate article undergoes decomposition when heated and/or when exposed to oxidizing conditions to yield lower molecular weight and/or volatile decomposition products that may be removed from the intermediate product. In one embodiment, the cured matrix is converted at least in part to gaseous products which are then separated from the intermediate article by any suitable method, such as by applying a vacuum and/or by causing a gas stream to pass over and/or through the intermediate article. Once the gaseous products are so removed from the intermediate article, further processing (sintering) of the intermediate article may be conducted so as to generate the sintered article, as will be described hereafter in more detail, although in other embodiments decomposition of the cured matrix, removal of gaseous decomposition products generated from the cured matrix, and sintering of the thermoplastic particles may occur concurrently. Decomposition of the matrix obtained by curing of the curable (meth)acrylate resin component may be carried out simultaneously or concurrently with removal of the gaseous decomposition products and/or sintering of the thermoplastic particles to form a sintered article. In another embodiment, at least a portion of the decomposition products are non-gaseous substances of relatively low molecular weight having solubility in a solvent which permits removal of such decomposition products by washing the treated intermediate article while not dissolving the sinterable thermoplastic particles.

Any of the following types of (meth)acrylate-functionalized compounds may, for example, be employed in the curable (meth)acrylate resin component of the present invention: monomers such as (meth)acrylate esters of aliphatic mono-alcohols, (meth)acrylate esters of alkoxylated aliphatic mono-alcohols, (meth)acrylate esters of aliphatic polyols, (meth)acrylate esters of alkoxylated aliphatic polyols, (meth)acrylate esters of aromatic ring-containing alcohols, and (meth)acrylate esters of alkoxylated aromatic ring-containing alcohols; and oligomers such as epoxy (meth)acrylates, polyether (meth)acrylates, urethane (meth) acrylates, polyester (meth)acrylates (including amine- and sulfide-modified derivatives thereof); and combinations thereof.

Suitable (meth)acrylate-functionalized oligomers include, for example, polyester (meth)acrylates, epoxy (meth)acrylates, polyether (meth)acrylates, urethane (meth)acrylates (sometimes also referred to as polyurethane (meth)acrylates or urethane (meth)acrylate oligomers) and combinations thereof, as well as amine-modified and sulfide-modified variations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). To prepare the polyester (meth) acrylates, the hydroxyl groups of the polyester polyols are then partially or fully esterified by reacting with (meth) acrylic acid, (meth)acryloyl chloride, (meth)acrylic anhydride or the like. Polyester (meth)acrylates may also be synthesized by reacting a hydroxyl-containing (meth)acrylate such as a hydroxyalkyl (meth)acrylate (e.g., hydroxyethyl acrylate) with a polycarboxylic acid. The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Exemplary polyether (meth)acrylate oligomers include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of epoxides and other oxygen-containing heterocyclic compounds (e.g., ethylene oxide, 1,2-propylene oxide, butene oxide, tetrahydrofuran and combinations thereof) with a starter molecule. Suitable starter molecules include water, hydroxyl functional materials, polyester polyols and amines. Polyetherols may also be obtained by the condensation of diols such as glycols.

Urethane (meth)acrylates (sometimes also referred to as "polyurethane (meth)acrylates") capable of being used in the curable compositions of the present invention include urethanes based on aliphatic and/or aromatic polyester polyols, polyether polyols and polycarbonate polyols and aliphatic and/or aromatic polyester diisocyanates and polyether diisocyanates capped with (meth)acrylate end-groups.

In various embodiments, the urethane (meth)acrylates may be prepared by reacting aliphatic and/or aromatic polyisocyanates (e.g., diisocyanates, triisocyanates) with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl (meth) acrylate or hydroxypropyl (meth)acrylate to provide terminal (meth)acrylate groups. For example, the urethane (meth)acrylates may contain two, three, four or more (meth) acrylate functional groups per molecule. Other orders of addition may also be practiced to prepare the polyurethane (meth)acrylate, as is known in the art. For example, the hydroxyl-functionalized (meth)acrylate may be first reacted with a polyisocyanate to obtain an isocyanate-functionalized (meth)acrylate, which may then be reacted with an OH group terminated polyester polyol, polyether polyol, polycarbonate polyol, polycaprolactone polyol, polydimethysiloxane polyol, polybutadiene polyol, or a combination thereof. In yet another embodiment, a polyisocyanate may be first reacted with a polyol, including any of the aforementioned types of polyols, to obtain an isocyanate-functionalized polyol, which is thereafter reacted with a hydroxyl-functionalized (meth)acrylate to yield a polyurethane (meth)acrylate. Alternatively, all the components may be combined and reacted at the same time.

Any of the above-mentioned types of oligomers may be modified with amines or sulfides (e.g., thiols), following procedures known in the art. Such amine- and sulfide-modified oligomers may be prepared, for example, by reacting a relatively small portion (e.g., 2-15%) of the (meth) acrylate functional groups present in the base oligomer with an amine (e.g., a secondary amine) or a sulfide (e.g., a thiol), wherein the modifying compound adds to the carbon-carbon double bond of the (meth)acrylate in a Michael addition reaction.

Illustrative examples of suitable monomeric (meth)acrylate-functionalized compounds include (meth)acrylated mono-alcohols, (meth)acrylated polyols (polyalcohols), (meth)acrylated alkoxylated mono-alcohols and (meth)acrylated alkoxylated polyols. The mono-alcohols and polyols may be aliphatic (including one or more cycloaliphatic rings) or may contain one or more aromatic rings (as in the case of phenol or bisphenol A). "Alkoxylated" means that the base mono-alcohol or polyol has been reacted with one or more epoxides such as ethylene oxide and/or propylene oxide so as to introduce one or more ether moieties (e.g., $—CH_2CH_2—O—$) onto one or more hydroxyl groups of the mono-alcohol or polyol, prior to esterification to introduce one or more (meth)acrylate functional groups. For example, the amount of epoxide reacted with the mono-alcohol or polyol may be from about 1 to about 30 moles of epoxide per mole of mono-alcohol or polyol. Examples of suitable mono-alcohols include, but are not limited to, straight chain, branched and cyclic C1-C54 mono-alcohols (which may be primary, secondary or tertiary alcohols). For instance, the mono-alcohol may be a C1-C7 aliphatic mono-alcohol. In another embodiment, the mono-alcohol may be a C8-C24 aliphatic mono-alcohol (e.g., lauryl alcohol, stearyl alcohol). The mono-alcohol could also be a mono-alkyl ether of a diol (e.g., a glycol) or a mono-alkyl ether of a polyoxyalkylene glycol such as a polyethylene glycol, wherein the alkyl group may be for example a C1-C8 alkyl group. Examples of suitable polyols include organic compounds containing two, three, four or more hydroxyl groups per molecule such as glycols (diols), e.g., ethylene glycol, 1,2- or 1,3-propylene glycol, or 1,2-, 1,3- or 1,4-butylene glycol, neopentyl glycol, trimethylolpropane, tricthylolpropane, pentacrythritol, glycerol and the like.

Representative, but not limiting, examples of suitable monomeric (meth)acrylate-functionalized compounds include: 1,3-butylene glycol di(meth)acrylate, 1,4-butanediol di(meth)acrylate, 1,6-hexanediol di(meth)acrylate, longer chain aliphatic di(meth)acrylates (such as those generally corresponding to the formula $H_2C{=}CRC({=}O)—O—(CH_2)_m—O—C({=}O)\ CR'{=}CH_2$, wherein R and R' are independently H or methyl and m is an integer of 8 to 24), alkoxylated (e.g., ethoxylated, propoxylated) hexanediol di(meth)acrylates, alkoxylated (e.g., ethoxylated, propoxylated) neopentyl glycol di(meth)acrylates, dodecyl di(meth) acrylates, cyclohexane dimethanol di(meth)acrylates, diethylene glycol di(meth)acrylates, dipropylene glycol di(meth) acrylates, alkoxylated (e.g., ethoxylated, propoxylated) bisphenol A di(meth)acrylates, ethylene glycol di(meth) acrylates, neopentyl glycol di(meth)acrylates, tricyclodecane dimethanol diacrylates, triethylene glycol di(meth)acrylates, tetraethylene glycol di(meth)acrylates, tripropylene glycol di(meth)acrylates, ditrimethylolpropane tetra(meth)acrylates, dipentaerythritol penta (meth)acrylates, alkoxylated (e.g., ethoxylated, propoxylated) pentaerythritol tetra(meth)acrylate, dipentaerythritol penta (meth)acrylates, pentaerythritol tetra(meth)acrylate, alkoxylated (e.g., ethoxylated, propoxylated)trimethylolpropane tri (meth)acrylates, alkoxylated (e.g., ethoxylated, propoxylated) glyceryl tri(meth)acrylates, trimethylolpropane tri (meth)acrylates, pentaerythritol tri(meth)acrylates, tris(2-hydroxy ethyl) isocyanurate tri(meth)acrylates, 2 (2-ethoxyethoxy) ethyl (meth)acrylates, 2-phenoxyethyl (meth)acrylates, 3,3,5-trimethylcyclohexyl (meth)acrylates, alkoxylated lauryl (meth)acrylates, alkoxylated phenol (meth)acrylates, alkoxylated tetrahydrofurfuryl (meth)acrylates, caprolactone (meth)acrylates, cyclic trimethylolpropane formal (meth)acrylates, sdicyclopentadienyl (meth) acrylates, diethylene glycol methyl ether (meth)acrylates, alkoxylated (e.g., ethoxylated, propoxylated) nonyl phenol (meth)acrylates, isobornyl (meth)acrylates, isodecyl (meth) acrylates, isooctyl (meth)acrylates, lauryl (meth)acrylates, methoxy polyethylene glycol (meth)acrylates, octyldecyl (meth)acrylates (also known as stearyl (meth)acrylates), tetrahydrofurfuryl (meth)acrylates, tridecyl (meth)acrylates, triethylene glycol ethyl ether (meth)acrylates, t-butyl cyclohexyl (meth)acrylates, dicyclopentadiene di(meth)acrylates, phenoxyethanol (meth)acrylates, octyl (meth)acrylates, decyl (meth)acrylates, dodecyl (meth)acrylates, tetradecyl (meth)acrylates, cetyl (meth)acrylates, hexadecyl (meth) acrylates, behenyl (meth)acrylates, diethylene glycol ethyl ether (meth)acrylates, diethylene glycol butyl ether (meth) acrylates, triethylene glycol methyl ether (meth)acrylates, dodecanediol di(meth)acrylates, dipentaerythritol penta/hexa (meth)acrylates, pentaerythritol tetra(meth)acrylates, alkoxylated (e.g., ethoxylated, propoxylated) pentaerythritol tetra(meth)acrylates, di-trimethylolpropane tetra(meth)acrylates, alkoxylated (e.g., ethoxylated, propoxylated) glyceryl tri(meth)acrylates, and tris(2-hydroxy ethyl) isocyanurate tri(meth)acrylates, and combinations thereof.

In order to obtain a polymeric matrix by curing of the curable (meth)acrylate resin component which may be thermally and/or oxidatively decomposed into gaseous and/or soluble products capable of being separated from the residual sinterable thermoplastic particles present in the intermediate article, the curable (meth)acrylate resin component may be formulated to contain a relatively high proportion of oxyalkylene segments (in particular, polyoxyalkylene segments). An oxyalkylene segment generally corresponds to the structural formula $—C—(C)_n—O—$, wherein the carbon atoms are aliphatic and may be substituted or unsubstituted and n is an integer of 2 or more (e.g., 2 to 4). For instance, the oxyalkylene segment may be $—CH_2CH_2—O—$, $—CH_2CH(CH_3)O—$, $—CH_2CH_2CH_2—O—$, $—CH_2CH_2CH_2CH_2—O—$ and the like. Examples of suitable polyoxyalkylene segments include, without limitation, polyoxyethylene, polyoxypropylene or polyoxyethylene/oxypropylene segments. The oxyalkylene or polyoxyalkylene segments may be supplied, for example, by one or more (meth)acrylate-functionalized monomers or oligomers selected from the group consisting of alkoxy polyethylene glycol mono(meth)acrylates (i.e., polyethylene glycols containing an alkyl ether end group and a (meth)acrylate end group), alkoxy polypropylene glycol mono(meth)acrylates (i.e., polypropylene glycols containing an alkyl ether end group and a (meth)acrylate end group), polyethylene glycol di(meth)acrylates (i.e., polyethylene glycols containing two (meth)acrylate end groups), alkoxylated bis-phenol di(meth) acrylates (i.e., bis-phenols, such as bis-phenol A, that have been alkoxylated by reaction with one or more alkylene oxides such as ethylene oxide and/or propylene oxide and then (meth)acrylated) and alkoxylated aliphatic polyalcohol (meth)acrylates (i.e., aliphatic polyalcohols, such as glycols, glycerol, pentaerythritol, trimethyolpropane, sugar alcohols, sugars and the like, that have been reacted with one or more alkylene oxides and then partially or fully (meth)acrylated). In various embodiments of the invention, the curable (meth) acrylate resin component may be comprised of at least 10%, at least 20%, at least 30%, at least 40%, at least 50% or at least 60% by weight in total of [poly]oxyalkylene segments. In general, a higher content of [poly]oxyalkylene segments is preferred, in order to facilitate decomposition and removal of the cured matrix formed from the (meth)acrylate resin component, recognizing that the (meth)acrylate resin component must contain some amount of structural moieties other than [poly]oxyalkylene segments (e.g., (meth)acrylate functional groups) in order for the (meth)acrylate resin component to be curable by means such as photopolymerization.

According to preferred embodiments of the invention, the composition of the curable (meth)acrylate resin component is selected such that it is a homogeneous (single phase) liquid at 25° C. and its viscosity at 25° C. is not excessive. Formulating the curable (meth)acrylate resin component to have a relatively low viscosity will facilitate mixing of the curable (meth)acrylate resin component and the sinterable thermoplastic particles and will help to provide a resulting composition which can be readily handled and further processed in accordance with the present invention. In various embodiments of the invention, for example, the curable (meth)acrylate resin component has a viscosity at 25° C. which is preferably less than 1500 centipoise, more preferably less than 800 centipoise, or most preferably less than 500 centipoise. Viscosity may be measured using a Brookfield viscometer.

Photoinitiators

If the curable composition is to be cured using light, such as ultraviolet light, it will generally be desirable to formulate the composition to include one or more photoinitiators. However, if electron beam or chemical curing is employed, then the curable composition need not contain any photoinitiator.

A photoinitiator is a compound that undergoes a photoreaction on absorption of light, producing reactive species. The reactive species which are generated then initiate polymerization of the reactive components of the curable (meth)acrylate resin component. Generally speaking, when the compounds present in the curable (meth)acrylate resin component contain carbon-carbon double bonds, such polymerization (curing) involves reaction of such carbon-carbon double bonds. The reactive species may be, for example, a free radical species or an anionic species, in various embodiments of the invention. Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof.

If photoinitiator is employed in the composition, it may generally be present in a total concentration of up to about 15% by weight based on the total weight of the curable (meth)acrylate resin component (e.g., a concentration of from about 0.1 to about 5% by weight based on the total weight of the curable (meth)acrylate resin component).

Other Components

The compositions of the present invention may optionally be comprised of one or more components in addition to those mentioned above. For example, the composition may comprise at least one stabilizer that assists in maintaining the homogeneity of the composition, so as to prevent or retard the settling of the sinterable thermoplastic particles if the composition is left undisturbed for an extended period of time. That is, such stabilizers help to maintain the composition as a relatively uniform suspension or dispersion of the sinterable thermoplastic particles in a liquid matrix of the curable (meth)acrylate resin component. Stabilizers such as surfactants may be used and special surfactant packages known in the art to match specific thermoplastics may also be used.

Additionally, flow promotors or non-reactive solvents could be added, from 1-15 wt % for example, to reduce the resin viscosity and allow a higher wt % loading of the sinterable thermoplastic particles. The solvents can then be removed from the cured intermediate article, before final processing, by evaporation or solvent extraction.

Methods of Forming Sintered Articles

The compositions of the present invention are useful for forming sintered articles. Such sintered articles may generally be obtained, for example, by a method comprising the following steps:

a) curing a composition in accordance with any of the above-described embodiments comprised of sinterable thermoplastic particles and a curable (meth)acrylate resin component to form an intermediate article comprised of the sinterable thermoplastic particles bound by a matrix of the curable (meth)acrylate resin component in cured form; and
b) subjecting the intermediate article to conditions effective to remove at least a portion of the matrix and to sinter the sinterable thermoplastic particles, whereby the sinterable thermoplastic particles are fused together to form a sintered article.

The curable (meth)acrylate resin component may be subjected to curing (which may involve partial or complete curing) by means of free radical polymerization or other types of polymerization (e.g., anionic or cationic polymerization). The composition comprising the sinterable thermoplastic particles and the curable (meth)acrylate resin component may be in any suitable or appropriate physical form such as, for example, a layer on a substrate or a shaped form defined by a mold. In certain embodiments, the composition is a free-flowing liquid at 25° C. In other embodiments, the composition is a paste or semi-solid at 25° C.

Curing of the curable (meth)acrylate resin component in accordance with the present invention may be carried out by any suitable method, such as free radical, cationic and/or anionic polymerization. One or more initiators, such as a free radical initiator (e.g., photoinitiator, peroxide initiator) may be present in the curable (meth)acrylate resin component. Prior to curing, the composition may be applied to a substrate surface in any known conventional manner, for example, by spraying, knife coating, roller coating, casting, drum coating, dipping, extrusion and the like and combinations thereof. If so desired, the composition could also be constrained or formed in some manner, including by placement in a mold, cavity or the like. Indirect application using a transfer process may also be used. A substrate may be any commercially relevant substrate, such as a metal substrate or plastic substrate. The substrates may comprise metal, paper, cardboard, glass, thermoplastics such as polyolefins, polycarbonate, acrylonitrile butadiene styrene (ABS), and blends thereof, composites, wood, leather and combinations thereof.

The curable (meth)acrylate resin component may be subjected to conditions effective to achieve at least partial curing. For example, at least 25% or at least 50% or at least 80% or at least 90% curing of the (meth)acrylate resin component may be achieved in various embodiments of the invention. As used herein, the term "% curing" refers to the percentage of the (meth)acrylate functional groups in the starting curable (meth)acrylate resin component that have reacted; the extent of such reaction may be calculated by spectroscopic methods involving measurement of the concentration of carbon-carbon double bonds present in such (meth)acrylate functional groups before and after being subjected to curing conditions.

Generally speaking, it will be desirable to carry out curing of the curable (meth)acrylate resin component to an extent effective to provide an intermediate article that is dimensionally stable at the processing temperatures employed (e.g., dimensionally stable at room temperature or 15° C. to 30° C.). In certain embodiments, the curable (meth)acrylate resin component is converted during curing from a liquid to a gel or semi-solid (relatively soft) state at 25° C. In other embodiments, the curable (meth)acrylate resin component is converted during curing from a liquid to a solid (relatively hard) state at 25° C.

Curing may be accelerated or facilitated by supplying energy to the curable (meth)acrylate resin component, such as by heating the composition and/or by exposing the composition to a radiation source, such as visible or UV light, infrared radiation, and/or electron beam radiation. Thus, the cured matrix may be deemed the reaction product of the curable (meth)acrylate resin component, formed by curing. The intermediate product thereby obtained thus may be characterized as comprising a cured matrix obtained by curing of the curable (meth)acrylate resin component, within which are contained the sinterable thermoplastic particles. The sinterable thermoplastic particles may be in at least partial contact with each other, or may be discrete particles embedded within the cured matrix which are separated from each other by the cured matrix.

The curable (meth)acrylate resin components used in the present invention are preferably formulated to be capable of being cured using LED (Light Emitting Diode) curing (e.g., UV LED curing, using radiation from a UV LED device) and/or capable of being used in high speed applications (such as three dimensional printing).

A plurality of layers of a composition in accordance with the present invention may be applied to a substrate surface; the plurality of layers may be simultaneously cured (by exposure to a single dose of radiation, for example) or each layer may be successively cured before application of an additional layer of the composition.

The compositions described herein are especially useful as 3D printing resin formulations, that is, compositions intended for use in manufacturing three dimensional articles using 3D printing techniques. Such three dimensional articles may be free-standing/self-supporting and may consist essentially of or consist of a composition that has been cured to react the curable (meth)acrylate resin component portion of the composition.

A method of making a three-dimensional article using a composition in accordance with the present invention may comprise the steps of:

a) applying a first layer of a composition in accordance with the present invention onto a surface;
b) curing (fully or partially) the first layer to provide a cured first layer;
c) applying a second layer of the composition onto the cured first layer;
d) curing (fully or partially) the second layer to provide a cured second layer adhered to the cured first layer; and
e) repeating steps c) and d) a desired number of times to build up the three-dimensional article.

The three-dimensional article thereby obtained may then be converted into a sintered article using any of the techniques described elsewhere herein.

Although the curing steps may be carried out by any suitable means, which will in some cases be dependent upon the components present in the composition (particularly the curable (meth)acrylate resin component), in certain embodiments of the invention the curing is accomplished by exposing the layer to be cured to an effective amount of radiation (e.g., electron beam radiation, UV radiation, visible light, etc.).

Accordingly, in various embodiments, the present invention provides a process comprising the steps of:

a) applying a first layer of a composition in accordance with the present invention and in liquid form onto a surface;
b) exposing the first layer imagewise to actinic radiation to form a first exposed imaged cross-section, wherein the radiation is of sufficient intensity and duration to cause at least partial curing (e.g., at least 25% or at least 50% or at least 80% or at least 90% curing) of the curable (meth)acrylate resin component present in the layer in the exposed areas;
c) applying an additional layer of the composition onto the previously exposed imaged cross-section;
d) exposing the additional layer imagewise to actinic radiation to form an additional imaged cross-section, wherein the radiation is of sufficient intensity and duration to cause at least partial curing (e.g., at least 30% or at least 50% or at least 80% or at least 90% curing) of the curable (meth)acrylate resin component present in the additional layer in the exposed areas and to cause adhesion of the additional layer to the previously exposed imaged cross-section;
c) repeating steps c) and d) a desired number of times to build up the three-dimensional article.

The intermediate article produced by curing of the curable (meth)acrylate resin component of the composition (for example, a three-dimensional article obtained by any of the above-mentioned procedures) is subjected to conditions effective to remove at least a portion of the matrix formed by curing of the curable (meth)acrylate resin component and to sinter the sinterable thermoplastic particles, whereby the sinterable thermoplastic particles are fused together to form a sintered article.

In one embodiment of the invention, the intermediate article is heated to a temperature effective to cause at least partial decomposition of the cured matrix produced from the curable (meth)acrylate resin component. However, such temperature should be selected so as to avoid significant decomposition of the sinterable thermoplastic particles. That is, the curable (meth)acrylate resin component is formulated so that, once cured, it decomposes at a temperature which is lower than the decomposition temperature of the thermoplastic particles. Providing an oxidant and/or decomposition catalyst during treatment of the intermediate article may help to accelerate the rate of decomposition of the cured matrix at a given temperature or permit decomposition to proceed at a lower temperature than would be possible in the absence of such oxidant or decomposition catalyst. For example, the intermediate article may be heated in an atmosphere comprised of oxygen. The air in the heated chamber may also be circulated or removed to further improve the rate of oxidation or decomposition. The curable (meth)acrylate resin component may comprise one or more metal species capable of promoting the decomposition of the cured matrix obtained from the curable (meth)acrylate resin component.

According to certain embodiments of the invention, the decomposition temperature of the cured matrix obtained from the curable (meth)acrylate resin composition is less than the decomposition temperature of the sinterable thermoplastic particles. As used herein, the term "decomposition temperature" means the temperature at which a 10 mg sample of a material (e.g., the cured matrix or the sinterable thermoplastic particles) exhibits a 50% loss in initial weight as measured by thermogravimetric analysis (TGA), wherein the temperature is increased at a rate of 10° C. per minute and the heating is performed under an air atmosphere. In preferred embodiments, the decomposition temperature of the cured matrix of the curable (meth)acrylate resin composition is less than, preferably at least 25° C. less than, or at least 50° C. less than, the Tm (melting point temperature) of the sinterable thermoplastic particles (where the thermoplastic is semi-crystalline or crystalline) or the Tg (glass transition temperature) of the sinterable thermoplastic particles (where the thermoplastic is amorphous).

Generally speaking, decomposition of the cured matrix results in the production of decomposition products having a lower molecular weight than that of the cured matrix. In one embodiment, at least a portion of the cured matrix is converted into decomposition products that are sufficiently volatile to exist as gases under the conditions employed to decompose the cured matrix, thus facilitating their removal from the intermediate article. In another embodiment, the decomposition products are sufficiently soluble in a solvent (e.g., an organic solvent) to be capable of being washed or leached out of the intermediate article or the sintered article by contacting the intermediate article or the sintered article with such solvent. The solvent should be selected to be a substance that is a non-solvent with respect to the thermoplastic particles (i.e., the thermoplastic particles do not dissolve to a significant extent in the solvent). The solvent may be heated during such contacting with the intermediate article or sintered article, to facilitate removal of the soluble decomposition products.

Sintering of the thermoplastic particles in the intermediate article or during conversion of the composition to an intermediate article may be carried out under conditions effective to fuse together the thermoplastic particles (which in some cases may have residual curable (meth)acrylate resin component in cured form and/or decomposition products generated therefrom on at least a portion of the surfaces of the thermoplastic particles) while avoiding complete melting of the thermoplastic particles. For example, the intermediate article may be heated to a temperature at most 25° C. below the melting point temperature of the thermoplastic particles. In one embodiment, such heating may be carried out in a mold within which the intermediate article is placed. The intermediate article may be subjected to compaction, e.g., within the mold, during such heating. For example, a sintered article may be produced by fusing the sinterable thermoplastic particles contained in the intermediate article under elevated temperature and pressure conditions. When heated, the thermoplastic particles contained within the intermediate article may fuse at the point of contact, creating a solidified body (which in certain embodiments may be a porous body). According to certain embodiments, the thermoplastic particles retain their shape, save for the slight softening at the point of contact where fusing occurs as the temperature is reduced from the elevated temperatures to near ambient levels.

According to certain embodiments, sintering may be performed by bringing an object to the appropriate sintering temperature and holding it for a period of time and then slowly cooling it down (allow the thermoplastic to recrystallize, where the thermoplastic is at least partially crystalline, or to fully solidify). The sintering temperature is generally related to the melting point temperature of the thermoplastic, but depending on the material, flow rate, crystallization temperature and other factors, it could be below, at, or slightly above the melting point temperature of the thermoplastic. Laser sintering techniques, such as those known in the art, may be employed in the present invention.

Various non-limiting aspects of the present invention may be summarized as follows:

Aspect 1: A composition comprised of, consisting essentially of or consisting of sinterable thermoplastic particles and a curable (meth)acrylate resin component, wherein the sinterable thermoplastic particles are insoluble in the curable (meth)acrylate resin component at 25° C.

Aspect 2: The composition of Aspect 1, wherein the sinterable thermoplastic particles are comprised of, consist essentially of or consist of at least one thermoplastic selected from the group consisting of polyaryletherketones, polyamides, polyimides, polycarbonates and fluoropolymers.

Aspect 3: The composition of Aspect 1, wherein the sinterable thermoplastic particles have a melting point greater than 250° C., a glass transition temperature greater than 200° C., or a melting point greater than 250° C. and a glass transition temperature greater than 200° C.

Aspect 4: The composition of Aspect 3, wherein the sinterable thermoplastic particles are comprised of, consist essentially of or consist of at least one thermoplastic selected from the group consisting of polyetheretherketones, polyetherketoneketones and polyimides.

Aspect 5: The composition of Aspect 1, wherein the sinterable thermoplastic particles have a melting point greater than 150° C., a glass transition temperature greater than 100° C., or a melting point greater than 150° C. and a glass transition temperature greater than 100° C.

Aspect 6: The composition of Aspect 5, wherein the sinterable thermoplastic particles are comprised of at least one thermoplastic selected from the group consisting of polyamides, polyvinylidene fluorides and polycarbonates.

Aspect 7: The composition of any of Aspects 1 to 6, wherein the sinterable thermoplastic particles have a volume median diameter (Dv50), as measured by a scanning electron microscope when dry, of from 10 to 100 microns.

Aspect 8: The composition of any of Aspects 1 to 7, wherein the curable (meth)acrylate resin component is photocurable.

Aspect 9: The composition of any of Aspects 1 to 8, wherein the curable (meth)acrylate resin component is comprised of, consists essentially of or consists of one or more (meth)acrylate-functionalized monomers or oligomers.

Aspect 10: The composition of any of Aspects 1 to 9, wherein the curable (meth)acrylate resin component is comprised of, consists essentially of or consists of one or more (meth)acrylate-functionalized monomers or oligomers containing one or more polyoxyalkylene segments.

Aspect 11: The composition of any of Aspects 1 to 10, wherein the curable (meth)acrylate resin component is comprised of, consists essentially of or consists of one or more (meth)acrylate-functionalized monomers or oligomers containing one or more polyoxyethylene, polyoxypropylene or polyoxyethylene/oxypropylene segments.

Aspect 12: The composition of any of Aspects 1 to 11, wherein the curable (meth)acrylate resin component is comprised of, consists essentially of or consists of one or more (meth)acrylate-functionalized monomers or oligomers selected from the group consisting of alkoxy polyethylene glycol mono(meth)acrylates, alkoxy polypropylene glycol mono(meth)acrylates, polyethylene glycol di(meth)acrylates, alkoxylated bis-phenol di(meth)acrylates and alkoxylated aliphatic polyalcohol (meth)acrylates.

Aspect 13: The composition of any of Aspects 1 to 12, wherein the curable (meth)acrylate resin component has a viscosity at 25° C. of less than 1500 centipoise.

Aspect 14: The composition of any of Aspects 1 to 13, wherein the curable (meth)acrylate resin component has a viscosity at 25° C. of less than 800 centipoise.

Aspect 15: The composition of any of Aspects 8 to 12, wherein the curable (meth)acrylate resin component is additionally comprised of at least one photoinitiator.

Aspect 16: The composition of any of Aspects 1 to 15, wherein the curable (meth)acrylate resin component is a homogeneous liquid at 25° C.

Aspect 17: The composition of any of Aspects 1 to 16, wherein the curable (meth)acrylate resin component, when cured, has a decomposition temperature lower than the melting point of the sinterable thermoplastic particles or, if the sinterable thermoplastic particles do not have a melting point, lower than the glass transition temperature of the sinterable thermoplastic particles.

Aspect 18: The composition of any of Aspects 1 to 17, wherein the composition is comprised of from 25 to 60 weight % sinterable thermoplastic particles and 40 to 75 weight % curable (meth)acrylate resin component based on the total weight of sinterable thermoplastic particles and curable (meth)acrylate resin component.

Aspect 19: A method of forming a sintered article, comprising:

a) curing a composition in accordance with any of Aspects 1 to 18 to form an intermediate article comprised of the sinterable thermoplastic particles bound by a matrix of the curable (meth)acrylate resin component in cured form; and b) subjecting the intermediate article to conditions effective to remove at least a portion of the matrix and to sinter the sinterable thermoplastic particles, whereby the sinterable thermoplastic particles are fused together to form a sintered article.

Aspect 20: The method of Aspect 19, wherein the curing in step a) is carried out by irradiating the curable (meth) acrylate resin component.

Aspect 21: The method of Aspect 19 or 20, wherein the conditions in step b) comprise heating the intermediate article at a temperature effective to at least partially decompose the curable (meth)acrylate resin composition in cured form while avoiding decomposition of the sinterable thermoplastic particles.

Aspect 22: The method of Aspect 21, wherein following heating of the intermediate article the intermediate article comprises decomposition products of the curable (meth) acrylate resin composition in cured form and the intermediate is contacted with a solvent which is effective to remove at least a portion of the decomposition products.

Aspect 23: The method of any of Aspects 19 to 22, wherein the conditions in step b) comprise compacting the intermediate article.

Aspect 24: The method of any of Aspects 19 to 23, wherein the conditions in step b) comprise exposing the intermediate article to a laser beam.

Aspect 25: The method of any of Aspects 19 to 24, wherein the method comprises three dimensional printing.

Aspect 26: The method of any of Aspects 19 to 25, wherein in step b) removal of at least a portion of the matrix and sintering of the sinterable thermoplastic particles take place concurrently.

Aspect 27: The method of any of Aspects 19 to 26, wherein in step b) removal of at least a portion of the matrix takes place before sintering of the sinterable thermoplastic particles.

Aspect 28: The method of any of Aspects 19 to 27, wherein the sintered article is thermoplastic.

Aspect 29: A method of making a sintered article, comprising:

a) applying a first layer of a composition in accordance with any of Aspects 1 to 18 onto a surface;

b) curing the first layer to provide a cured first layer;

c) applying a second layer of the composition onto the cured first layer;

d) curing the second layer to provide a cured second layer adhered to the cured first layer;

e) repeating steps c) and d) a desired number of times to build up a three-dimensional article comprised of the sinterable thermoplastic particles bound by a matrix of the curable (meth)acrylate resin component in cured form; and f) subjecting the three-dimensional article to conditions effective to remove at least a portion of the matrix and to sinter the sinterable thermoplastic particles, whereby the sinterable thermoplastic particles are fused together to form a sintered article.

Aspect 30: A method of making a three dimensionally printed article using digital light projection, stereolithography or multi jet printing, comprising irradiating a composition in accordance with any of Aspects 1 to 18 in a layer by layer manner to form the three dimensionally printed article.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process using the composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

35 parts by weight (pbw) of polyetherketoneketone (PEKK) powder (T:I ratio=70:30; Dv50=60 microns) was added to 65 pbw polyethylene glycol dimethacrylate (SR 210A, from Sartomer), along with 1 pbw photoinitiator. The resulting composition was bulk cured on a petri dish, at a thickness of about 1 cm. A piece of the cured sample was broken off, weighed and then placed in oven at 300° C. for four hours. The sample was removed from the oven and weighed again; the mass of the heated sample was only 50% of the original mass. This means that the sample after heat treatment contained about 30 wt % of the cured matrix derived from the polyethylene glycol dimethacrylate and about 70% PEKK (i.e., the majority of the cured matrix derived from the polyethylene glycol dimethacrylate was removed as a consequence of the oven heating step).

Example 2

35 parts by weight (pbw) of polyetherketoneketone (PEKK) powder (T:I ratio=70:30; Dv50=60 microns) is added to 65 pbw polyethylene glycol dimethacrylate (SR 210A, from Sartomer), along with 1 pbw photoinitiator and a PEKK-compatible surfactant. A small part (2 cm by 1 cm by 0.5 cm) is printed on an Ember 3D printer using the aforementioned composition. The 3D printed part is weighed, then placed in an oven at 325° C. for four hours. A loss (through decomposition and volatilization) of most of the cured matrix derived from the polyethylene glycol dimethacrylate is expected, leaving a part containing over 80% by weight PEKK.

The invention claimed is:

1. A composition comprised of sinterable thermoplastic particles and a curable (meth)acrylate resin component having a viscosity at 25° C. of less than 1500 centipoise, wherein the sinterable thermoplastic particles are insoluble in the curable (meth)acrylate resin component at 25° C. and are comprised of at least one thermoplastic selected from the group consisting of polyaryletherketones and polyimides.

2. A composition comprised of sinterable thermoplastic particles and a curable (meth)acrylate resin component, wherein the sinterable thermoplastic particles are insoluble in the curable (meth)acrylate resin component at 25° C., wherein the sinterable thermoplastic particles have a glass transition temperature greater than 100° C.

3. The composition of claim 1, wherein the sinterable thermoplastic particles have a melting point greater than 250° C., a glass transition temperature greater than 200° C., or a melting point greater than 250° C. and a glass transition temperature greater than 200° C.

4. The composition of claim 3, wherein the sinterable thermoplastic particles are comprised of at least one thermoplastic selected from the group consisting of polyetheretherketones, polyetherketoneketones and polyimides.

5. The composition of claim 2, wherein the sinterable thermoplastic particles are comprised of at least one thermoplastic selected from the group consisting of polyaryletherketones, polyamides, polyimides, polycarbonates and fluoropolymers.

6. The composition of claim 5, wherein the sinterable thermoplastic particles are comprised of at least one thermoplastic selected from the group consisting of polyamides, polyvinylidene fluorides and polycarbonates.

7. The composition of claim 1, wherein the sinterable thermoplastic particles have a volume median diameter (Dv50), as measured by a scanning electron microscope when dry, of from 10 to 100 microns.

8. The composition of claim 1, wherein the curable (meth)acrylate resin component is photocurable.

9. The composition of claim 1, wherein the curable (meth)acrylate resin component is comprised of one or more (meth)acrylate-functionalized monomers or oligomers.

10. The composition of claim 1, wherein the curable (meth)acrylate resin component is comprised of one or more (meth)acrylate-functionalized monomers or oligomers containing one or more polyoxyalkylene segments.

11. The composition of claim 1, wherein the curable (meth)acrylate resin component is comprised of one or more (meth)acrylate-functionalized monomers or oligomers containing one or more polyoxyethylene, polyoxypropylene or polyoxyethylene/oxypropylene segments.

12. The composition of claim 1, wherein the curable (meth)acrylate resin component is comprised of one or more (meth)acrylate-functionalized monomers or oligomers selected from the group consisting of alkoxy polyethylene glycol mono(meth)acrylates, alkoxy polypropylene glycol mono(meth)acrylates, polyethylene glycol di(meth)acrylates, alkoxylated bis-phenol di(meth)acrylates and alkoxylated aliphatic polyalcohol (meth)acrylates.

13. The composition of claim 1, wherein the curable (meth)acrylate resin component has a viscosity at 25° C. of less than 800 centipoise.

14. The composition of claim 1, wherein the curable (meth)acrylate resin component is additionally comprised of at least one photoinitiator.

15. The composition of claim 1, wherein the curable (meth)acrylate resin component is a homogeneous liquid at 25° C.

16. The composition of claim 1, wherein the curable (meth)acrylate resin component, when cured, has a decomposition temperature lower than the melting point of the sinterable thermoplastic particles or, if the sinterable thermoplastic particles do not have a melting point, lower than the glass transition temperature of the sinterable thermoplastic particles.

17. The composition of claim 1, wherein the composition is comprised of from 25 to 60 weight % sinterable thermoplastic particles and 40 to 75 weight % curable (meth) acrylate resin component based on the total weight of sinterable thermoplastic particles and curable (meth)acrylate resin component.

18. A method of forming a sintered article, comprising:

a) curing a composition in accordance with claim 1 to form an intermediate article comprised of the sinterable thermoplastic particles bound by a matrix of the curable (meth)acrylate resin component in cured form; and b) subjecting the intermediate article to conditions effective to remove at least a portion of the matrix and to sinter the sinterable thermoplastic particles, whereby the sinterable thermoplastic particles are fused together to form a sintered article.

19. The method of claim 18, wherein the curing in step a) is carried out by irradiating the curable (meth)acrylate resin component.

20. The method of claim 18, wherein the conditions in step b) comprise heating the intermediate article at a temperature effective to at least partially decompose the curable (meth)acrylate resin composition in cured form while avoiding decomposition of the sinterable thermoplastic particles.

21. The method of claim 20, wherein following heating of the intermediate article the intermediate article comprises decomposition products of the curable (meth)acrylate resin composition in cured form and the intermediate is contacted with a solvent which is effective to remove at least a portion of the decomposition products.

22. The method of claim 18, wherein the conditions in step b) comprise compacting the intermediate article.

23. The method of claim 18, wherein the conditions in step b) comprise exposing the intermediate article to a laser beam.

24. The method of claim 18, wherein the method comprises three dimensional printing.

25. The method of claim 18, wherein in step b) removal of at least a portion of the matrix and sintering of the sinterable thermoplastic particles take place concurrently.

26. The method of claim 18, wherein in step b) removal of at least a portion of the matrix takes place before sintering of the sinterable thermoplastic particles.

27. The method of claim 18, wherein the sintered article is thermoplastic.

28. A method of making a sintered article, comprising:

a) applying a first layer of a composition in accordance with claim 1 onto a surface;

b) curing the first layer to provide a cured first layer;

c) applying a second layer of the composition onto the cured first layer;

d) curing the second layer to provide a cured second layer adhered to the cured first layer;

e) repeating steps c) and d) a desired number of times to build up a three-dimensional article comprised of the sinterable thermoplastic particles bound by a matrix of the curable (meth)acrylate resin component in cured form; and f) subjecting the three-dimensional article to conditions effective to remove at least a portion of the matrix and to sinter the sinterable thermoplastic particles, whereby the sinterable thermoplastic particles are fused together to form a sintered article.

29. A method of making a three dimensionally printed article using digital light projection, stereolithography or multi jet printing, comprising irradiating a composition in accordance with claim 1 in a layer by layer manner to form the three dimensionally printed article.

30. The composition of claim 5, wherein the sinterable thermoplastic particles have a melting point greater than 150° C.

31. The composition of claim 5, wherein the sinterable thermoplastic particles have a melting point greater than 150° C.

32. A composition comprised of sinterable thermoplastic particles and a curable (meth)acrylate resin component, wherein the sinterable thermoplastic particles are insoluble in the curable (meth)acrylate resin component at 25° C. and are comprised of at least one thermoplastic selected from the group consisting of polyaryletherketones, and polyimides, wherein the curable (meth)acrylate resin component is a homogeneous liquid at 25° C.

33. The composition of claim 1, wherein the at least one thermoplastic comprises polyaryletherketone and the polyaryletherketone is selected from the group consisting of polyetherketoneketone (PEKK), polyetheretherketone (PEEK), polyetherketone (PEK), polyetherketoneetherketoneketone (PEKEKK), and mixtures thereof.

34. The composition of claim 32, wherein the at least one thermoplastic comprises polyaryletherketone and the polyaryletherketone is selected from the group consisting of polyetherketoneketone (PEKK), polyetheretherketone (PEEK), polyetherketone (PEK), polyetherketoneetherketoneketone (PEKEKK), and mixtures thereof.

* * * * *